United States Patent
Aoyama et al.

(10) Patent No.: US 8,218,450 B2
(45) Date of Patent: Jul. 10, 2012

(54) THROUGHPUT ESTIMATION METHOD AND SYSTEM

(75) Inventors: Akio Aoyama, Minato-ku (JP); Kojiro Hamabe, Minato-ku (JP)

(73) Assignee: NEC Corporation, Tokyo (JP)

( * ) Notice: Subject to any disclaimer, the term of this patent is extended or adjusted under 35 U.S.C. 154(b) by 274 days.

(21) Appl. No.: 12/601,333

(22) PCT Filed: May 9, 2008

(86) PCT No.: PCT/JP2008/058613
§ 371 (c)(1),
(2), (4) Date: Nov. 23, 2009

(87) PCT Pub. No.: WO2008/143026
PCT Pub. Date: Nov. 27, 2008

(65) Prior Publication Data
US 2010/0188997 A1    Jul. 29, 2010

(30) Foreign Application Priority Data
May 24, 2007   (JP) .................... 2007-137853

(51) Int. Cl.
H04J 1/16   (2006.01)
(52) U.S. Cl. ......................................... 370/252
(58) Field of Classification Search .................. 370/252, 370/328–339
See application file for complete search history.

(56) References Cited

U.S. PATENT DOCUMENTS

| | | |
|---|---|---|
| 5,796,722 A | 8/1998 | Kotzin et al. |
| 8,005,433 B2 * | 8/2011 | Wigren ............ 455/67.13 |
| 2003/0003921 A1 | 1/2003 | Laakso |
| 2004/0185868 A1 | 9/2004 | Jain et al. |
| 2005/0117533 A1 | 6/2005 | Cave |
| 2005/0169301 A1 | 8/2005 | Jain et al. |
| 2006/0018277 A1 | 1/2006 | Petrovic et al. |
| 2007/0111663 A1 | 5/2007 | Beyer et al. |
| 2009/0176455 A1 * | 7/2009 | Wigren et al. ........ 455/67.13 |

FOREIGN PATENT DOCUMENTS

| | | |
|---|---|---|
| JP | 07-283778 A | 10/1995 |
| JP | 11-509717 A | 8/1999 |
| JP | 2001-168904 A | 6/2001 |
| JP | 2002-533984 A | 10/2002 |
| JP | 2003-224515 A | 8/2003 |
| JP | 2005-303658 A | 10/2005 |
| JP | 2005-538650 A | 12/2005 |
| JP | 2006-060789 A | 3/2006 |
| JP | 2006-522510 A | 9/2006 |
| JP | 2006-340400 A | 12/2006 |
| JP | 2007-511180 A | 4/2007 |

* cited by examiner

*Primary Examiner* — Frank Duong
(74) *Attorney, Agent, or Firm* — Sughrue Mion, PLLC

(57) ABSTRACT

In a throughput estimation method for estimating throughput of a first channel in a cellular system in which the first channel and a second channel that are used for an uplink wireless communication service in a cell, noise rise of the second channel is calculated from the traffic volume of the second channel, the noise rise and a target RTWP that is the target total reception power of the base station that is set in the base station are used to calculate a ratio of resources used for the wireless communication service that can be allocated to the first channel, and the resource ratio is then used to calculate the throughput of the first channel.

12 Claims, 10 Drawing Sheets

THROUGHPUT ESTIMATION METHOD AND SYSTEM

TECHNICAL FIELD

The present invention relates to a throughput estimation method and system for estimating throughput in a cellular system that provides an uplink wireless communication service and that is provided with a base station for managing at least one cell.

BACKGROUND ART

In recent years, HSUPA (High-speed Uplink Packet Access) has been established as the standard for high-speed packet communication in the upward direction, and the application of HSUPA to a cellular system provided with a base station for managing at least one cell for providing a wireless communication service such as a W-CDMA (Wideband Code Division Multiple Access) system is now being investigated. In order to design a system that satisfies the needs of a wireless communication service as prescribed by this HSUPA, the throughput of user data (hereinbelow referred to as "user throughput") of the designed system must be estimated and verified.

In a system that conforms with HSUPA, user throughput fluctuates instantaneously because a scheduling process for carrying out data transmission according to the control of transmission power and the order of priority and an adaptive data transmission process for adaptively controlling the degree of data multiplexing are implemented in accordance with fluctuations in the uplink reception quality in the base station. As a result, the HSUPA process must be simulated in detail over a long time period and at high time resolution to accurately estimate user throughput.

In an actual cell, user terminals that use dedicated channels that are allocated to each user terminal to perform uplink communication coexist with user terminals that use HSUPA channels to perform communication to transmit HSUPA data, and this state must be assumed to estimate the user throughput.

As a result, in a throughput estimation system of the related art, the reception quality of each channel is estimated based on various setting values that are applied as input by operators, and the user throughput is estimated by simulating the processes of the cellular system including the upper-layer processes in a state that is closer to the actual state. Such simulation that includes these upper-layer processes is referred to as "system-level simulation."

FIG. 1 shows an example of the procedure of a system-level simulation when HSUPA channels and individual uplink channels coexist.

The throughput estimation system shown in FIG. 1 can be realized by a computer (system-level simulator 300) in which programs for simulation are installed.

As shown in FIG. 1, the base station configuration, the traffic volume of the HSUPA channel, and the traffic volume of a dedicated channel used at a user terminal are entered as setting values into system-level simulator 300 by an operator. System-level simulator 300 estimates the reception quality of the HSUPA channel and dedicated channel based on the base station configuration or the traffic volume of each channel and executes the above-described system simulation to estimate the user throughput for each channel.

The received SIR (Signal to Interference power Ratio), which is the ratio of the received power to the interference power, is normally used for the reception quality of each channel. The base station configuration is information indicating the state of the base station, and includes information such as: the location of the base station; the maximum transmission power; the pattern or gain of the antenna; the antenna bearing; the antenna tilt; settings information for scheduling processes; the Target RTWP (Received Total Wideband Power), which is the target total reception power in the base station that is used in the transmission power control of user terminals; the Target SIR of the DPCCH (Dedicated Physical Control CHannel) that is used as the target SIR during HSUPA channel reception in the base station; the target SIR that is the target SIR during dedicated channel reception in the base station; the NF (Noise Figure) of the reception device provided in the base station; and thermal noise Nt.

The procedure of the throughput estimation system shown in FIG. 1 is next described.

System-level simulator 300 first arranges a user terminal in a random position and causes the user terminal to move. Traffic is generated according to the traffic volume of the HSUPA channel and dedicated channels that were entered as input by the operator in the user terminal that is in motion.

Next, system-level simulator 300 both controls the transmission power in the user terminal and calculates the instantaneous interference power from other user terminals in the cell and user terminals in other cells to calculate the uplink reception quality of each channel in the base station.

System-level simulator 300 then carries out a scheduling process and adaptive data transmission process based on the reception quality of each channel and calculates the instantaneous user throughput of each channel.

System-level simulator 300 repeats the above-described calculation processes every 2 ms, which is the processing period prescribed by HSUPA, and determines whether or not the calculation processes have been repeated at least a predetermined number of times that is determined in advance for obtaining the desired estimation accuracy. If the calculation processes have been repeated at least the predetermined number of times, the average value of the user throughput for each identical position of the user terminal in each repeated process result is calculated. If the above-described calculation processes have not been repeated at least the predetermined number of times, the user terminal is caused to move and the processes up to that point are repeated.

Finally, the averaged HSUPA channel user throughput (hereinbelow referred to as "HSUPA throughput") and the user throughput of dedicated channels (hereinbelow abbreviated as "dedicated channel throughput") for each position of the user terminal are supplied as output.

To obtain an estimation result of user throughput having high reliability by a statistics process, the above-described calculation processes of a 2-ms unit must be continuously executed for approximately one hour or more, and a highly precise estimated value of user throughput is obtained by executing this repeated process. However, continuous execution of the above-described calculation processes of 2-ms units for one hour or more results in a vast amount of calculation and a lengthy processing time.

This lengthening of the processing time becomes particularly problematic when investigating an ideal base station configuration that satisfies user throughput. The problem arises because the above-described system-level simulation is executed each time the base station configuration is altered, and the lengthy processing is repeated over and over, making the total time of the repeated processing extremely long.

The above-described lengthening of processing is also problematic when estimating the geographical distribution of the HSUPA throughput according to a plurality of states of a cellular system (hereinbelow referred to as "scenarios") in which the state of mixing of HSUPA channels and dedicated channels differs. This problem arises because the above-described series of processes is repeated for each assumed scenario, resulting in a massive total processing time.

However, Monte Carlo simulation is known as a conventional method of estimating dedicated channel throughput whereby snapshots are modeled to carry out simulation repeatedly to find an estimated value of throughput. A snapshot is information indicating the state of a cellular system (user terminal positions, the generation or non-generation of traffic, the amount of interference power that arrives from other cells, etc.) that is obtained at any instantaneous time point.

A dedicated channel does not experience instantaneous fluctuation in uplink user throughput according to reception quality as does a HSUPA channel, and user throughput can therefore be estimated in a relatively short process time interval. As a result, Monte Carlo simulation is frequently used in the estimation of user throughput of dedicated channels. For example, Japanese Laid-Open Patent Publication No. 2003-224515 discloses a simulation method in which Monte Carlo simulation snapshots are corrected.

The above-described Monte Carlo simulation can be used when estimating not only the user throughput of a dedicated channel but also HSUPA throughput. However, as described hereinabove, user terminals that use dedicated channels to communicate and user terminals that use HSUPA channels to communicate coexist in an actual cell. A method that can precisely estimate HSUPA throughput using Monte Carlo simulation in a state in which traffic of dedicated channels and HSUPA channels coexists has yet to be established.

In the case of a cellular system that is made up of a plurality of cells, the influence of HSUPA channel traffic generated by user terminals in other cells upon a user terminal in the cell of interest, i.e., the interference power value from other cells (hereinbelow referred to as "other-cell HSUPA interference power value") must be considered when estimating HSUPA throughput, but when the other-cell HSUPA interference power value is modeled for each snapshot, the problem occurs that the other-cell HSUPA interference power value undergoes great fluctuation in each snapshot. As a result, the number of repeated processes of the Monte Carlo simulation must be greatly increased when averaging the fluctuation in the other-cell HSUPA interference power value, raising the problem of lengthy processing time of the Monte Carlo simulation.

SUMMARY

It is therefore an object of the present invention to provide a throughput estimation method and system that enable precise estimation of the throughput of an HSUPA channel in a short processing time when uplink dedicated channels coexist in a cell.

In order to accomplish the above objects, the exemplary aspect of the invention provides a throughput estimation method for estimating throughput of a first channel in a cellular system that provides an uplink wireless communication service, that is equipped with a base station for managing at least one cell, and in which the first channel and a second channel coexist in the cell and are used in the uplink wireless communication service; the throughput estimation method including steps of: calculating noise rise of the second channel from the traffic volume of the second channel; using the noise rise and a target RTWP that is the target total reception power of the base station and that is set in the base station to calculate the ratio of resources that are used in the wireless communication service that can be allocated to the first channel; and using the resource ratio to calculate throughput of the first channel.

The exemplary aspect of the invention provides a throughput estimation system for estimating throughput of a first channel in a cellular system that provides an uplink wireless communication service, that is equipped with a base station for managing at least one cell, and in which the first channel and a second channel that are used in the uplink wireless communication service coexist in the cell; the throughput estimation system including: first simulation means for estimating throughput of the first channel from the traffic volume of the first channel; second simulation means for calculating noise rise of the second channel from the traffic volume of the second channel; resource ratio calculation means for: calculating target cell load from the target RTWP that is the target total reception power of the base station that is set in the base station, calculating the second channel cell load from the noise rise of the second channel, and finding a ratio R of resources that are used in the wireless communication service that can be allocated to the first channel from R=1−(second channel cell load/target cell load); and throughput correction means for using the resource ratio R to correct throughput of the first channel that was estimated by the first simulation means.

EXEMPLARY EMBODIMENT

The present invention is next described with reference to the accompanying figures.
(First Exemplary Embodiment)

Figure 2:
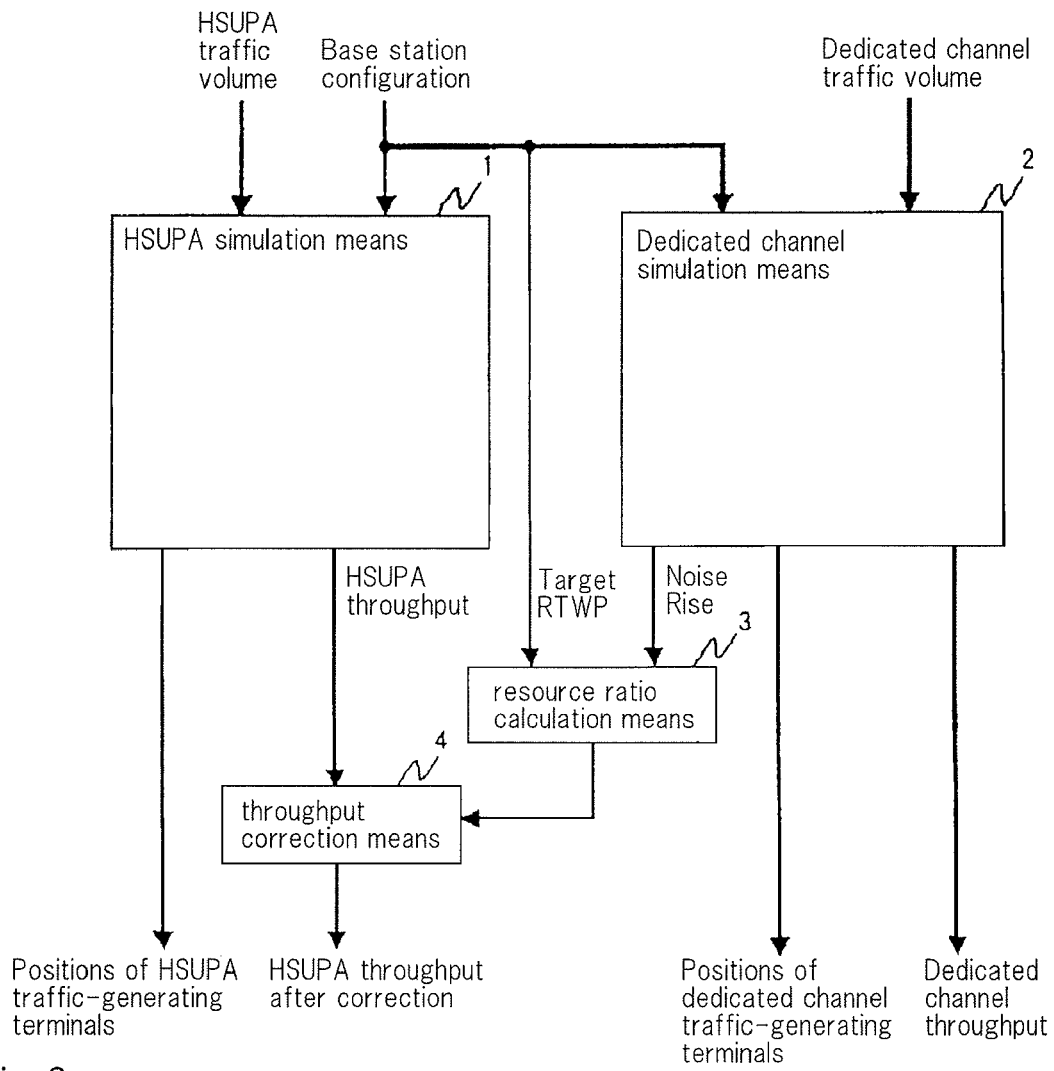
FIG. 2 is a block diagram showing the configuration of the throughput estimation system of the first exemplary embodiment.

FIG. 2 is a block diagram showing the configuration of the throughput estimation system of the first exemplary embodiment.

As shown in FIG. 2, the throughput estimation system of the first exemplary embodiment is provided with HSUPA simulation means 1, dedicated channel simulation means 2, resource ratio calculation means 3, and throughput correction means 4.

The throughput estimation system of the first exemplary embodiment independently executes an HSUPA throughput estimation process that uses Monte Carlo simulation and a dedicated channel throughput estimation process that uses Monte Carlo simulation. The throughput estimation system further calculates ratio R of resources that can be allocated to HSUPA channels and uses the value of this resource ratio R to correct the estimation result of the HSUPA throughput that was supplied as output from HSUPA simulation means 1.

HSUPA simulation means 1 executes Monte Carlo simulation based on the base station configuration and the traffic volume of the HSUPA channels that were applied as input by the operator, and supplies as output the positions of the user terminals that generate traffic on the HSUPA channels (hereinbelow referred to as the "HSUPA traffic-generating terminals") and the HSUPA throughput at these positions.

Dedicated channel simulation means 2 executes Monte Carlo simulation based on the base station configuration and the traffic volume of the dedicated channels that were applied as input by the operator and supplies as output the positions of the user terminals that generate traffic of the dedicated channels (hereinbelow referred to as the "dedicated channel traffic-generating terminal") and the uplink dedicated channel throughput at these positions. Dedicated channel simulation means 2 further supplies noise rise that is represented by RTWP/(NF×Nt) at the base station. It is here assumed that RTWP, NF, and Nt all use true values. It is further assumed that true values are used in each of the variables in each formula shown hereinbelow.

Resource ratio calculation means 3 uses the target RTWP of the dedicated channel that is information included in the base station configuration that was applied as input by the operator and the Noise Rise that was supplied from dedicated channel simulation means 2 to calculate ratio R of resources that can be allocated to HSUPA channels.

When calculating the resource ratio R, resource ratio calculation means 3 first uses Formula (1) shown below to find the Cell Load of dedicated channels.

Noise Rise of dedicated channels=1/(1−Cell Load of the dedicated channels)        (1)

It is known that the relation between Noise Rise and Cell Load is typically represented by the above formula (1). The Cell Load of a dedicated channel shows the traffic volume of the dedicated channel that is generated in a cell.

Resource ratio calculation means 3 next uses the Target RTWP, the thermal noise Nt and NF of the reception device provided in the base station, and the following Formula (2) to find the Target Cell Load, which is the target value of the Cell Load of dedicated channels.

Target RTWP/(NF×Nt)=1/(1−Target Cell Load)        (2)

Because the transmission power of the HSUPA channels is controlled in each HSUPA traffic-generating terminal in a cell such that the RTWP in the base station does not exceed the Target RTWP, the Target Cell Load is the maximum permissible load that indicates the maximum traffic volume that can be transmitted by the HSUPA channels and dedicated channels in the cell.

Resource ratio calculation means 3 next finds the ratio R of resources that can be allocated to the HSUPA channels by the following Formula (3):

R=1−(dedicated channel Cell Load/Target Cell Load)        (3)

Figure 3:
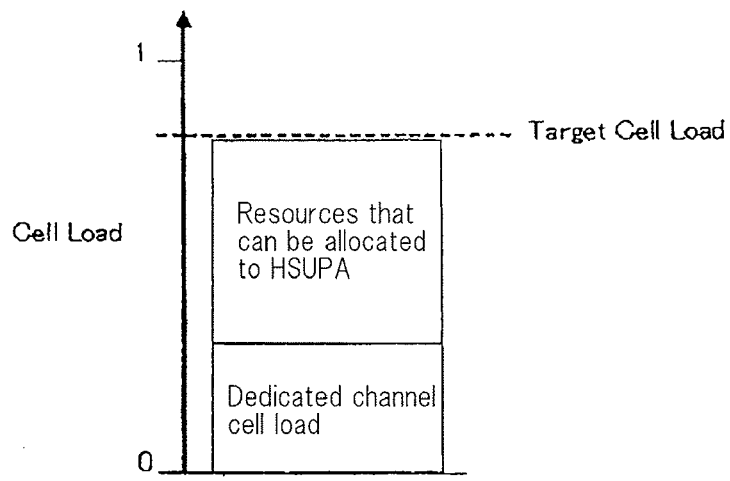
FIG. 3 is a schematic view showing the relation of resources that can be allocated to HSUPA channels and the Cell Load of dedicated channels.

Normally, resources that are used for data transmission are allocated with greater priority to dedicated channels than to HSUPA channels, and the relation between resources that can be allocated to the HSUPA channels and the Cell Load of dedicated channels is therefore as shown in the schematic view of FIG. 3 when HSUPA channels and dedicated channels coexist. In other words, resource ratio R is the proportion of resources that can be allocated to HSUPA channels with respect to the maximum permissible load (Target Cell Load) of the cell.

Resource ratio calculation means 3 supplies the resource ratio R that was calculated to throughput correction means 4.

Throughput correction means 4 multiplies function f(R) that takes the resource ratio R as an argument by the HSUPA throughput that was supplied from HSUPA simulation means 1 and supplies the result of multiplication as the HSUPA throughput after correction. The reason for multiplying the HSUPA throughput that was estimated in HSUPA simulation means 1 by the resource ratio R in throughput correction means 4 is explained hereinbelow.

When resource ratio R is large, the resources that can be allocated to HSUPA channels are great, whereby the transmission power of the user terminal increases and the HSUPA throughput rises. On the other hand, when the resource ratio R is small, the resources that can be allocated to HSUPA channels are limited, whereby the transmission power of the user terminal decreases and the HSUPA throughput becomes low. In other words, ratio R of resources that can be allocated to HSUPA channels and the HSUPA throughput are considered to be in a substantially proportional relation. Accordingly, the correction function that is used in throughput correction means 4 in the present exemplary embodiment is taken as f(R)=R.

The throughput estimation system shown in FIG. 2 may be of any configuration as long as the above-described processes of the HSUPA simulation means 1 and dedicated channel simulation means 2 can be executed independently, and for example, can be realized by a computer that is provided with a plurality of CPUs or DSPs that execute processes separately in accordance with a plurality of programs, or by a plurality of computers. Resource ratio calculation means 3 and throughput correction means 4 may be realized by executing processes by a computer that contains separate CPUs or DSPs, or may be realized by causing the computer that executes the processes of HSUPA simulation means 1 and dedicated channel simulation means 2 to execute these processes.

Figure 4:
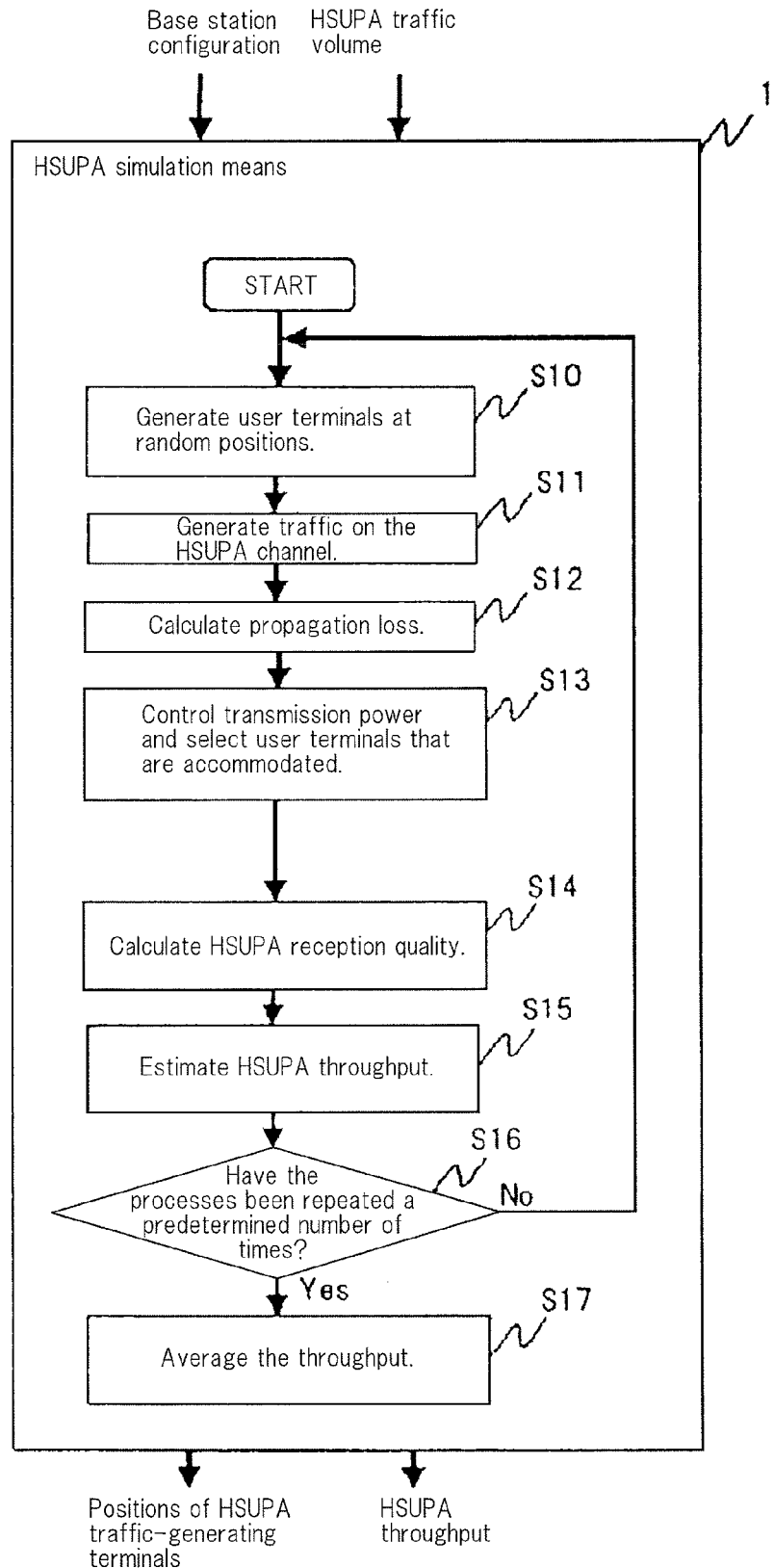
FIG. 4 is a flow chart showing the procedure of the HSUPA simulation means of the first exemplary embodiment.

The procedure of HSUPA simulation means 1 shown in FIG. 2 is next described using FIG. 4.

As shown in FIG. 4, HSUPA simulation means 1 first generates a plurality of user terminals at random positions in the cell (Step S10).

HSUPA simulation means 1 next causes the generation of traffic on the HSUPA channel of each user terminal according to the HSUPA channel traffic volume that was applied as input by the operator (Step S11).

HSUPA simulation means 1 next calculates the propagation loss between the positions of the HSUPA traffic-generating terminals and the position of the base station that is information contained in the base station configuration. The propagation loss is calculated by adding the shadowing loss to a known propagation loss estimation formula, of which the Okumura-Hata formula is representative (Step S12).

HSUPA simulation means 1 next, taking into consideration the antenna pattern or gain that is included in the base station configuration, implements transmission power control of the DPCCH of each user terminal such that the reception SIR of the DPCCH in the base station equals the Target SIR of the DPCCH that is information contained in the base station configuration. The control of the transmission power of HSUPA channels of user terminals by using already existing DPCCH is prescribed in HSUPA. In the present exemplary embodiment, a value obtained by adding a predetermined offset value to the transmission power of DPCCH is considered as the transmission power of the E-DPDCH (Enhanced-Dedicated Physical Data CHannel) of each user terminal, and as will be explained hereinbelow, the reception quality of HSUPA channels is calculated from the E-DPDCH reception power of user terminals in the base station.

Figure 5:
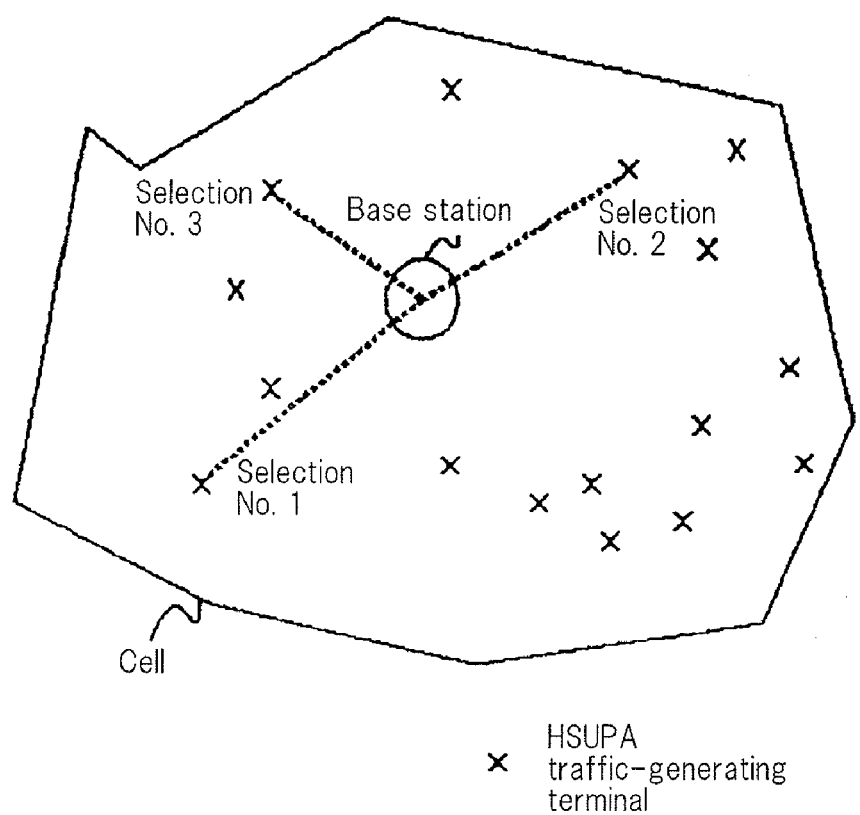
FIG. 5 is a schematic view showing the method of selecting HSUPA traffic-generating terminals that are accommodated by a base station that is executed in the HSUPA simulation means of the first exemplary embodiment.

HSUPA simulation means 1 calculates the reception power of E-DPDCH of each user terminal that is received at the base station, uses a predetermined selection method to sequentially select each user terminal accommodated by the base station, and adds the reception power of E-DPDCH of the selected user terminals. In the present exemplary embodiment, HSUPA traffic-generating terminals that are accommodated by a base station are randomly selected in one snapshot (see FIG. 5).

When a value obtained by adding (NF×Nt) to the total value of the previously found reception power in the base station, i.e., the RTWP value in the base station that rises with the generation of HSUPA channel traffic, exceeds the Target RTWP, or when all HSUPA traffic-generating terminals are selected, HSUPA simulation means 1 terminates further selection of HSUPA traffic-generating terminals. HSUPA simulation means 1 takes the selected user terminals as HSUPA traffic-generating terminals that are accommodated by the base station in the snapshot (Step S13).

HSUPA simulation means 1 next calculates the reception quality in the base station of the E-DPDCH of the HSUPA traffic-generating terminals that are accommodated by the base station. In the present exemplary embodiment, the ratio of reception power to interference power is used as the E-DPDCH reception quality (Step S14).

HSUPA simulation means 1 next, based on a separately created correspondence table of reception quality with respect to user throughput, estimates the user throughput of the HSUPA channels of the HSUPA traffic-generating terminals that are accommodated by the base station in the snapshot (Step S15).

Figure 1:
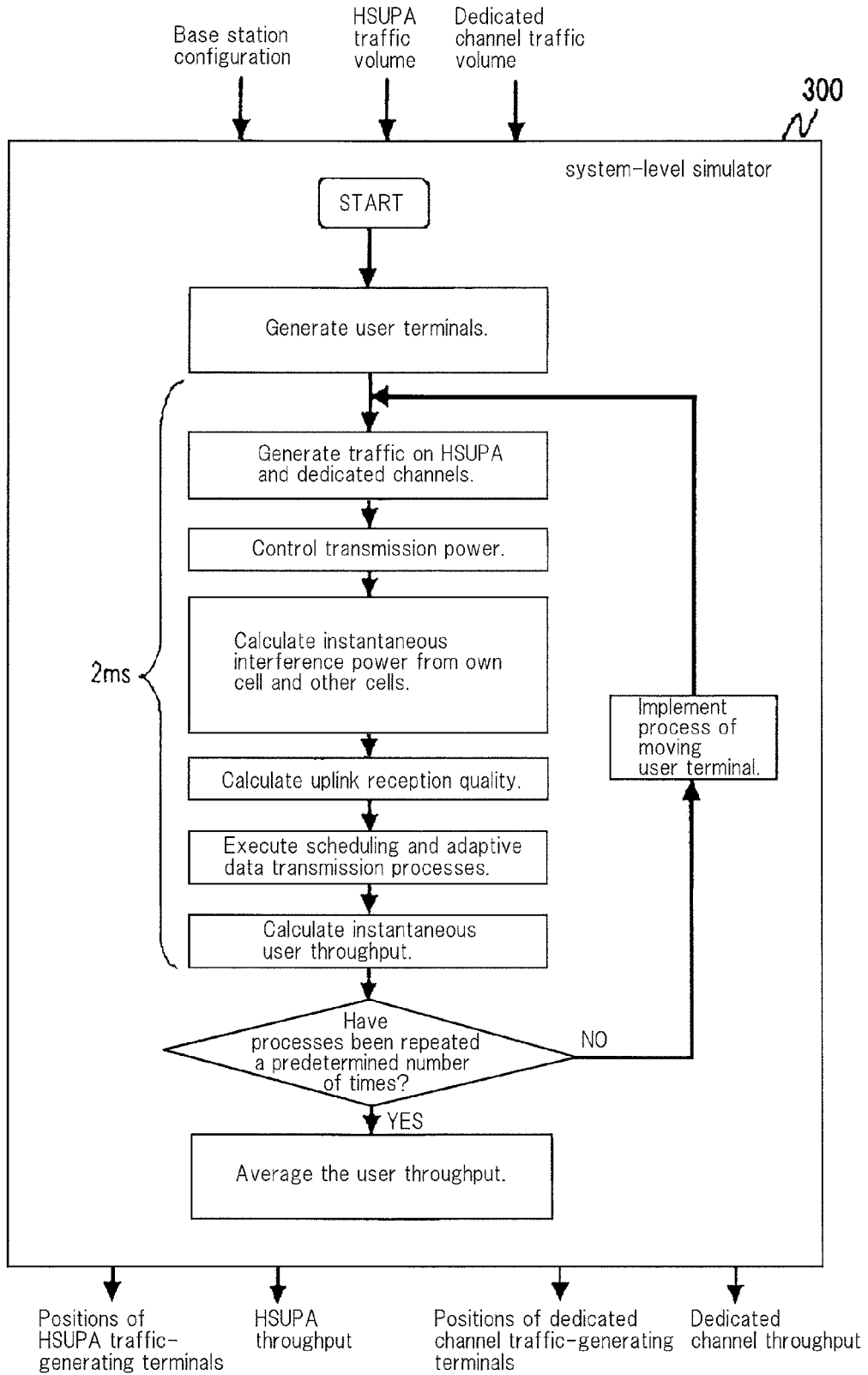
FIG. 1 is a flow chart showing an example of a the procedure of a continuous time system-level simulation when HSUPA channels and uplink dedicated channels coexist.
Figure 6:
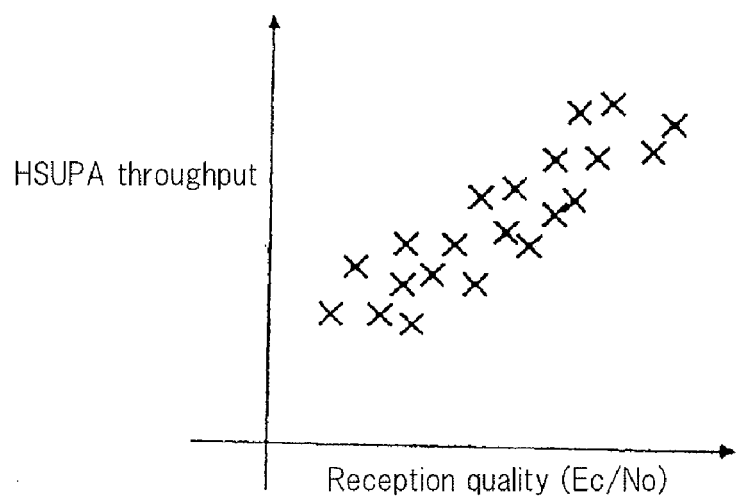
FIG. 6 is a graph showing the relation of the HSUPA throughput with respect to HSUPA channel reception quality (Ec/No) that is used in the creation of a correspondence table of the "reception quality" of an HSUPA channel with respect to "user throughput".

As shown in FIG. 1, because uplink reception quality is calculated every 2 ms in system-level simulation, not only can the positions of user terminals and user throughput be supplied as output, but statistics information of the uplink reception quality can also be supplied. Accordingly, system-level simulation such as shown in FIG. 1 is implemented in advance, and the relation of HSUPA throughput with respect to the reception quality (Ec/No) of the HSUPA channels such as shown in FIG. 6 is obtained. The correspondence table of reception quality and user throughput may then be created using the values found in the approximation curve that is based on the simulation results shown in FIG. 6.

HSUPA simulation means 1 next determines whether the number of times the above-described processes of Step S10 to Step S16 have been carried out has reached a predetermined number of times that was set in advance (Step S17). If the predetermined number of times has not been attained, the process returns to Step S10 and the process from Step S10 to Step S16 is repeated. When the predetermined number of times is attained, the process moves on to Step S17.

In Step S17, the average value of the user throughput of HSUPA traffic-generating terminals of the same position accommodated in the snapshot to that point is found (Step S17), and the positions of the HSUPA traffic-generating terminals and the HSUPA throughput at these positions are supplied as output.

Figure 7:
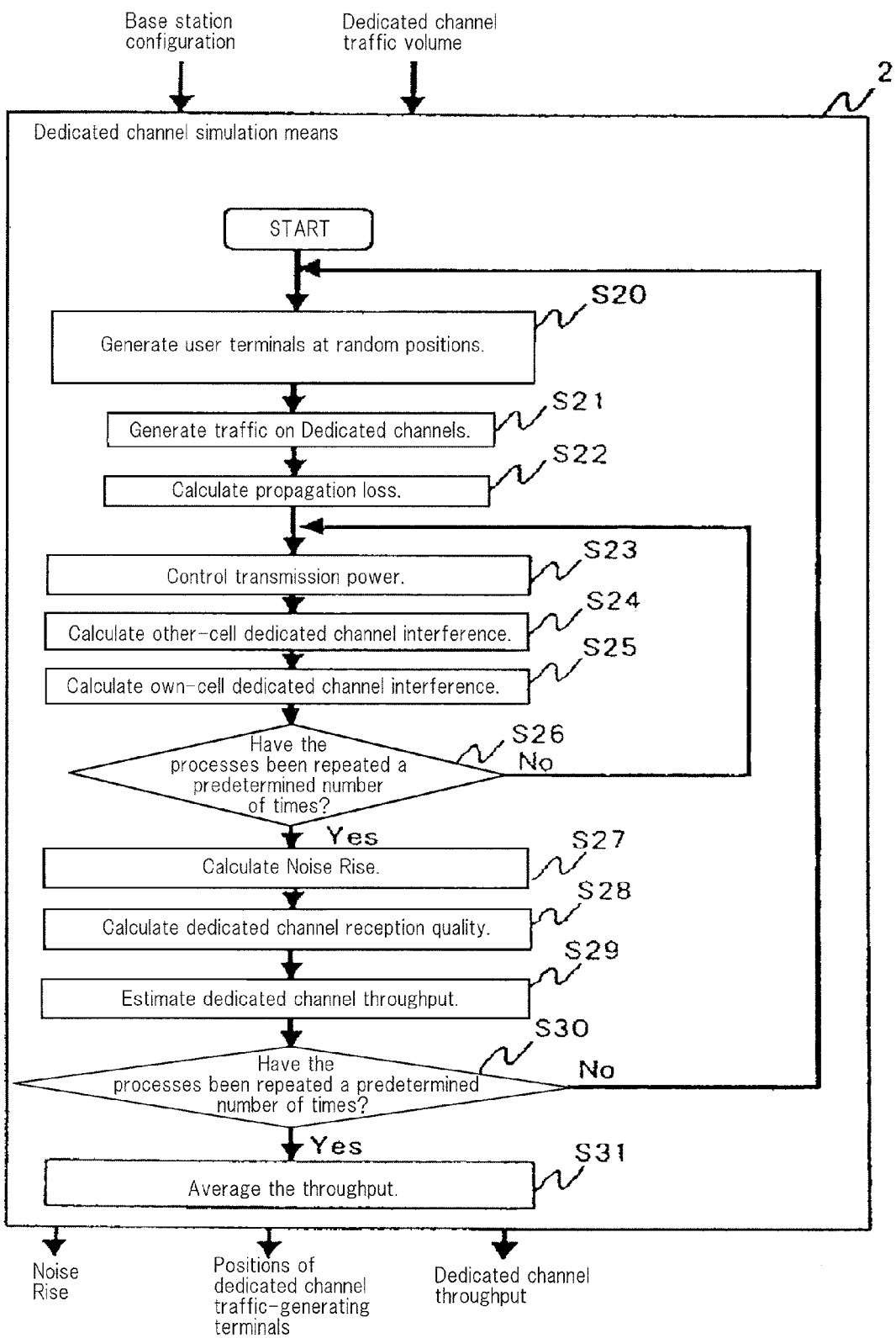
FIG. 7 is a flow chart showing the procedure of the dedicated channel simulation means of the first exemplary embodiment.

The procedure of dedicated channel simulation means 2 shown in FIG. 2 is next described using FIG. 7.

As shown in FIG. 7, dedicated channel simulation means 2 first arranges a plurality of user terminals at random positions in the cell (Step S20). Dedicated channel simulation means 2 next causes generation of traffic by the dedicated channel of each user terminal according to the traffic volume of the dedicated channels that was applied as input by the operator (Step S21).

Dedicated channel simulation means 2 next calculates the propagation loss between the positions of the dedicated channel traffic-generating terminals and the position of the base station, which is information contained in the base station configuration. The propagation loss is calculated by adding the shadowing loss in a known propagation loss estimation formula equivalent to the process of the above-described Step S12 (Step S22).

Dedicated channel simulation means 2 then, taking into consideration the antenna pattern or gain that is contained in the base station configuration of that cell (its own cell), implements transmission power control of the dedicated channel of each user terminal such that the reception SIR in the base station equals the Target SIR of the dedicated channels that is information contained in the set values of the base station configuration (Step S23).

Dedicated channel simulation means 2 next, when traffic of the dedicated channels in other cells is being generated, calculates the interference power that arrives from these user terminals (Step S24). When the traffic of a plurality of dedicated channels is being generated within its own cell, dedicated channel simulation means 2 calculates the interference power that arrives from these user terminals (Step S25).

Dedicated channel simulation means 2 next determines whether the number of times that the processes of the above-described Step S23 to Step S25 have been carried out has attained a predetermined number of times that was set in advance according to the number of dedicated channel traffic-generating terminals that generate traffic in other cells and in its own cell (Step S26). If the predetermined number of times has not been attained, the process returns to the Step S23 and the processes of Step S23 to Step S25 are repeated. When the predetermined number of times is attained, the process moves on to Step S27. By repeating the processes of Step S23 to Step S26 a plurality of times in this way, the influence of interference power caused by traffic of dedicated channels that is generated in its own cell or traffic of dedicated channels that is generated in other cells can be reflected in the simulation results.

In Step S27, dedicated channel simulation means 2 finds the Noise Rise that is represented by the total reception power RTWP in the base station divided by (NF×Nt) resulting from the generation of traffic on dedicated channels and supplies the result to the outside.

Dedicated channel simulation means 2 next calculates the reception quality of dedicated channels in the base station (Step S28).

Dedicated channel simulation means 2 next estimates the user throughput of dedicated channels based on a separately created correspondence table of "dedicated channel reception quality" and "user throughput" (Step S29).

Figure 8:
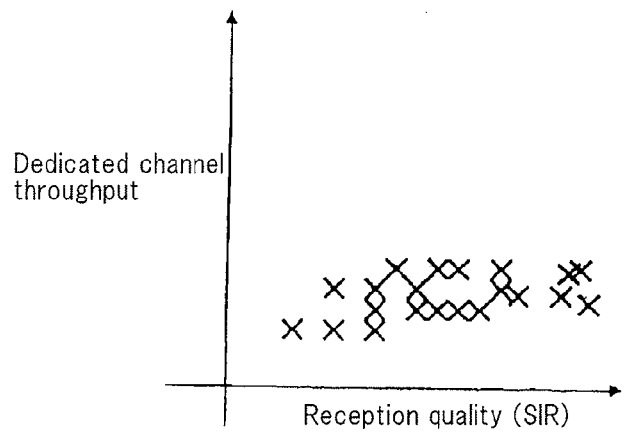
FIG. 8 is a graph showing the relation of the dedicated channel throughput with respect to the dedicated channel reception quality (SIR) that is used in the creation of the correspondence table of dedicated channel "reception quality" with respect to "user throughput".

Similar to HSUPA simulation means 1 described hereinabove, the correspondence table of "reception quality" and "user throughput" may be created by implementing in advance system-level simulation such as shown in FIG. 1 to obtain the relation of dedicated channel throughput with respect to the reception quality (SIR) of dedicated channels such as shown in FIG. 8 and then using values found by the approximation curve based on the simulation results.

Dedicated channel simulation means 2 next determines whether the number of times that the processes of the above-described Step S20 to Step S29 have been carried out has attained a predetermined number of times that was set in advance to obtain desired estimation accuracy (Step S30). If the predetermined number of times has not been attained, the process returns to Step S20 and the processes of Step S20 to Step S29 are repeated. When the predetermined number of times is attained, the process moves on to Steps S31.

Dedicated channel simulation means 2 finds the average value of the user terminal user throughput for which the position is identical that was generated in the snapshots to that point and supplies as output the positions of dedicated channel traffic-generating terminals and the dedicated channel user throughput (dedicated channel throughput) at these positions.

Figure 9:
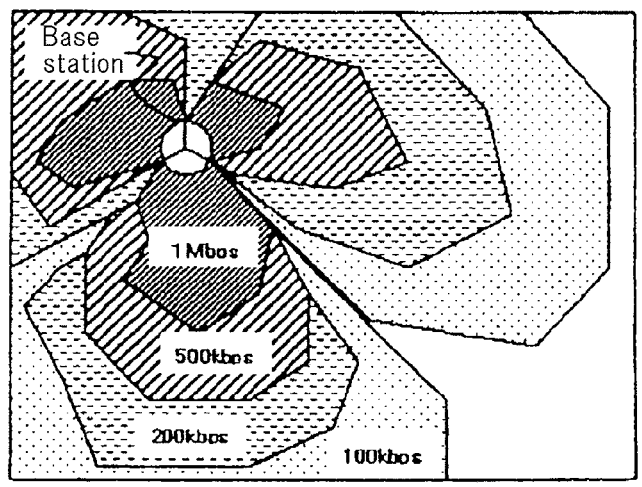
FIG. 9 is a schematic view showing an example of the representation of the geographical distribution of estimated user throughput.

Supplying the positions of user terminals that are present in the cell together with the user throughput of each channel at these positions thus enables estimation of the geographical distribution of user throughput in the cell. To facilitate visual comprehension, the estimated geographical distribution of user throughput may be represented as a plan as shown in FIG. 9, and further, may be represented by different colors according to the throughput values. FIG. 9 is provided with a single base station that manages three cells and shows an example of the geographical distribution of the user throughput of the HSUPA channel of the user terminals that exist around the base station.

According to the present exemplary embodiment, Monte Carlo simulation can be provided for estimating HSUPA throughput when traffic of HSUPA channels coexists with traffic of dedicated channels.

The throughput estimation system of the present exemplary embodiment eliminates the need for simulation that includes upper-layer processes every 2 ms, as in the system-level simulation shown in the background art, and thus enables a shortening of the processing time.

Even when the traffic of HSUPA channels coexists with the traffic of dedicated channels, the parallel processing of the HSUPA channels and dedicated channels enables a shortening of the processing time for obtaining the throughput estimation results.

Upon obtaining input values, throughput correction means 4 executes a correction process of multiplying a function f(R) to instantaneously supply a correction result, whereby the processing time for obtaining an HSUPA throughput estimation result can be shortened.

The above-described effects enable a shortening of the time required for obtaining the results of estimating HSUPA throughput in a plurality of different base station configurations that is necessary for the investigation of a base station configuration that satisfies the HSUPA standards.

Still further, when estimating the throughput for each of a plurality of scenarios in which the states of mixture of traffic of HSUPA channels and dedicated channel differ, the throughput of HSUPA channels and dedicated channels having different traffic volume is separately estimated and each of the results then simply combined to obtain the estimation results for a multitude of scenarios. For example, by using three scenarios 1A, 2A, and 3A of the traffic volume of HSUPA channels and scenarios 1B, 2B, and 3B of the traffic volume of dedicated channels, estimation results can be obtained for 3×3=9 different scenarios. As a result, the total processing time for obtaining the processing results for assumed scenarios can be shortened.

(Second Exemplary Embodiment)

The throughput estimation system of the second exemplary embodiment differs from the throughput estimation system of the first exemplary embodiment in that a logarithmic function is used as function f(R) used in throughput correction means 4 shown in FIG. 2. The configuration and operations are otherwise identical to the throughput estimation system shown in the first exemplary embodiment and explanation of these points is therefore here omitted.

In the throughput estimation system of the first exemplary embodiment, the function used in throughput correction means 4 was f(R)=R, but in the second exemplary embodiment, a logarithmic function is used to more closely approach the actual state.

Figure 10:
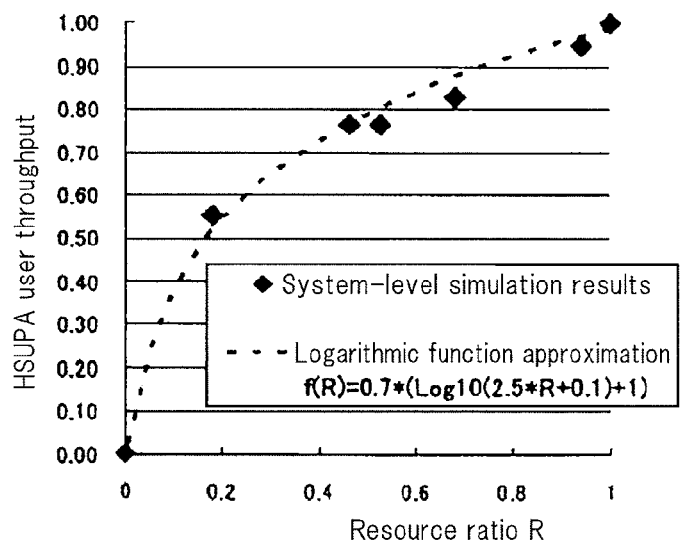
FIG. 10 is a graph showing the relation between ratio R of resources that can be allocated to HSUPA channels and the HSUPA throughput.

FIG. 10 is a graph showing the relation between ratio R of resources that can be allocated to HSUPA channels and the HSUPA throughput. FIG. 10 shows the relation of ratio R of resources that can be allocated to HSUPA channels and the HSUPA throughput that is obtained by implementing a system-level simulation such as shown in FIG. 1.

As shown in FIG. 10, the HSUPA throughput increases more greatly with respect to increase of resource ratio R in areas in which resource ratio R is small than in areas in which resource ratio R is large. In other words, it can be seen that the actual state of the characteristics of HSUPA throughput relative to resource ratio R is more closely realized by means of approximation by a logarithmic function.

According to the throughput estimation system of the present exemplary embodiment, the accuracy of estimation of HSUPA throughput can be improved over the first exemplary embodiment because the HSUPA throughput that is estimated by HSUPA channel simulation means 1 is corrected by using a correction function (logarithmic function) that is closer to reality in throughput correction means 4.

(Third Exemplary Embodiment)

Figure 11:
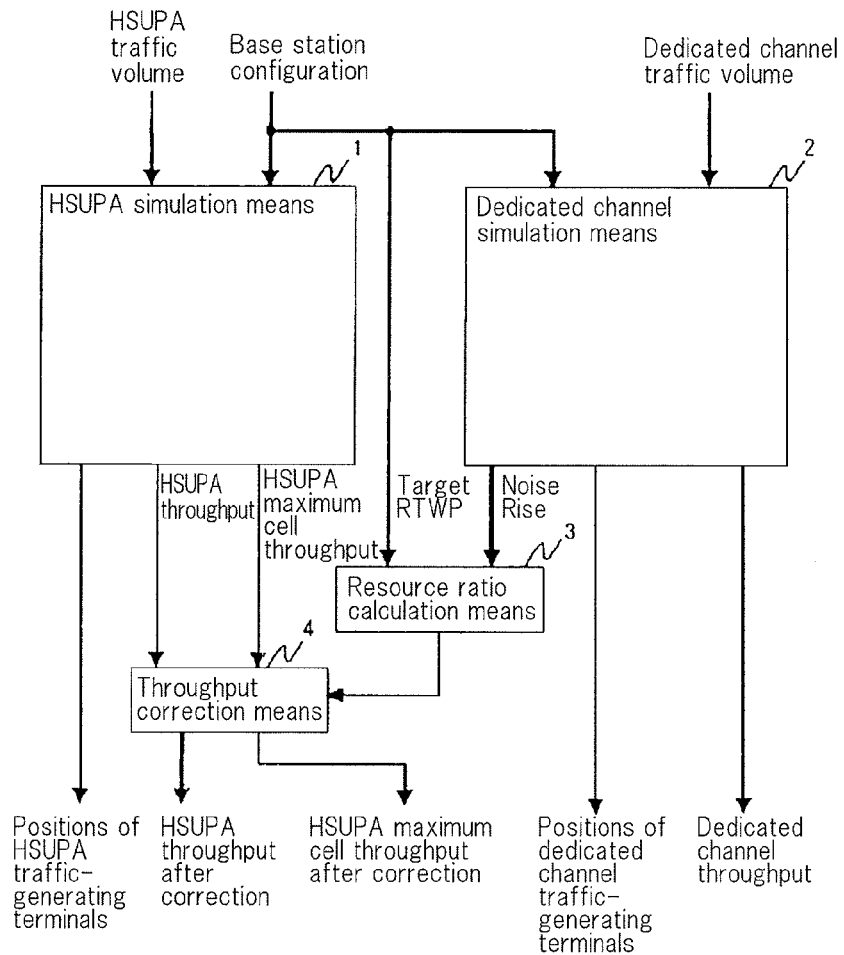
FIG. 11 is a block diagram showing the configuration of the throughput estimation system of the third exemplary embodiment.
Figure 12:
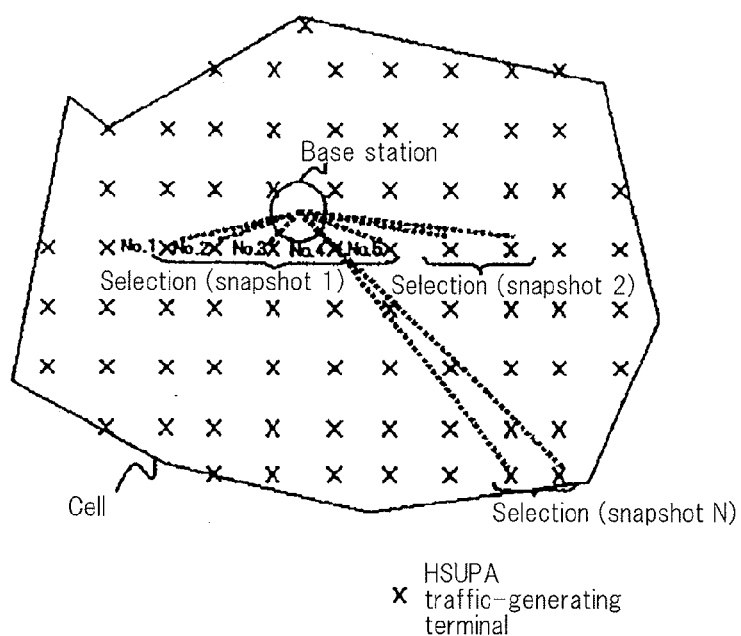
FIG. 12 is a schematic view showing the method of selecting HSUPA traffic-generating terminals that are accommodated by a base station by means of the HSUPA simulation means that is provided in the throughput estimation system of the third exemplary embodiment.

FIG. 11 is a block diagram showing the configuration of the throughput estimation system of the third exemplary embodiment.

As shown in FIG. 11, the throughput estimation system of the third exemplary embodiment differs from the first and second exemplary embodiments in that HSUPA simulation means 1 not only estimates HSUPA throughput as in the first exemplary embodiment and second exemplary embodiment, but also estimates the maximum cell throughput of HSUPA channels (hereinbelow referred to as "HSUPA maximum cell throughput"). The configuration and operations are otherwise equivalent to the throughput estimation system of the first exemplary embodiment or second exemplary embodiment, and explanation of these points is therefore here omitted.

User throughput is the throughput of user data that is measured in user terminals, and the maximum cell throughput indicates the total throughput in each cell that is measured at the base station. Realizing a HSUPA maximum cell throughput of a higher value is of key importance to those in the business of operating cellular systems who wish to achieve cellular systems with higher performance, and the accurate estimation of the HSUPA maximum cell throughput is therefore of crucial importance.

Increase of the traffic volume of HSUPA channels typically leads to increase of the cell throughput of HSUPA channels, but when traffic is generated that equals or surpasses a predetermined volume in HSUPA channels, the cell throughput of the HSUPA channels is saturated or decreases.

In the present exemplary embodiment, the HSUPA maximum cell throughput is estimated by HSUPA simulation means 1 by either of the two methods shown below.

In the first method of estimating the HSUPA maximum cell throughput, the processes from Step S10 to Step S17 of the processes of HSUPA simulation means 1 of the first exemplary embodiment shown in FIG. 4 are executed on the assumption that a sufficiently large value was received as the traffic volume of the HSUPA channel. However, processing is executed that differs from the first and second exemplary embodiments only for the processes of Step S15 and Step S17, as shown below.

In Step S15, the HSUPA throughput of HSUPA traffic-generating terminals that are accommodated by the base station in any snapshot is estimated based on a correspondence table of "reception quality" with respect to "user throughput" that is produced in advance, and the total value of this HSUPA throughput is taken as the HSUPA maximum cell throughput in that snapshot.

In Step S17, the average value of the HSUPA maximum cell throughput for each snapshot that was found in the process of Step S15 is found, and this average value is supplied as output.

In HSUPA simulation means 1 of the first exemplary embodiment, a simulation that is close to reality is implemented in which, as shown by the process of Step S13, the method of selecting user terminals that are accommodated by the base station is random for each snapshot and the actual location of user terminals is unclear. As a result, the first estimate method features superior estimation accuracy of the HSUPA maximum cell throughput.

In the second estimation method of the HSUPA maximum cell throughput, of the processes of HSUPA simulation means 1 of the first exemplary embodiment, the method of selecting HSUPA traffic-generating terminals that are accommodated by the base station in each snapshot in the process of Step S10 and Step S13 differs from the above-described first estimation method.

In the second estimation method, HSUPA simulation means 1 generates user terminals on lattice points that are provided at a predetermined spacing in the cell in Step S10.

In addition, as the method of selecting HSUPA traffic-generating terminals that are accommodated by the base station for each snapshot in Step S13, HSUPA simulation means 1 sequentially selects HSUPA traffic-generating terminals that were generated on lattice points one at a time from adjacent lattice points. However, it is assumed that HSUPA traffic-generating terminals on lattice points that were selected in the past in the process of Step S13 of the repeated processes (the processes from Step S10 to Step S16) are not repeatedly selected (refer to FIG. 11).

In the second estimation method, traffic of HSUPA channels is generated by user terminals on lattice points that are provided in a cell and HSUPA traffic-generating terminals of adjacent lattice points are sequentially selected, whereby simulations are possible for a best case in which many user terminals are located close to the base station and the HSUPA maximum cell throughput therefore reaches the maximum as well as for a worst case in which many user terminals are located at the borders of the cell and the HSUPA maximum cell throughput is therefore at the minimum. In addition, simulations are also possible for scenarios in which the traffic of the HSUPA channels is generated on all lattice points because HSUPA traffic-generating terminals on lattice points that were selected in the past are not again selected during the repeated processes.

Accordingly, because scenarios can be simulated in which HSUPA traffic is generated on all lattice point without duplication while including the best case and worst case in the throughput estimation system of the third exemplary embodiment, user throughput can be estimated in a short time while maintaining statistical accuracy.

Still further, the throughput estimation system of the third exemplary embodiment differs from the first and second exemplary embodiments in that throughput correction means 4 not only corrects the HSUPA throughput but also corrects the HSUPA maximum cell throughput.

Considering the point that limited physical resources are shared by HSUPA channels and dedicated channels, the relation between ratio R of resources that can be allocated to HSUPA channels and HSUPA maximum cell throughput is substantially the same as the relation between resource ratio R and user throughput that was shown in the first and second exemplary embodiments. Throughput correction means 4 of the present exemplary embodiment executes a correction process of multiplying the function f(R) by the HSUPA maximum cell throughput that was supplied from HSUPA simulation means 1. As function f(R), the function f(R)=R shown in the first exemplary embodiment or the logarithmic function shown in the second exemplary embodiment may be adopted.

According to the throughput estimation system of the present exemplary embodiment, the HSUPA maximum cell throughput can be estimated in addition to the HSUPA throughput.

Figure 13:
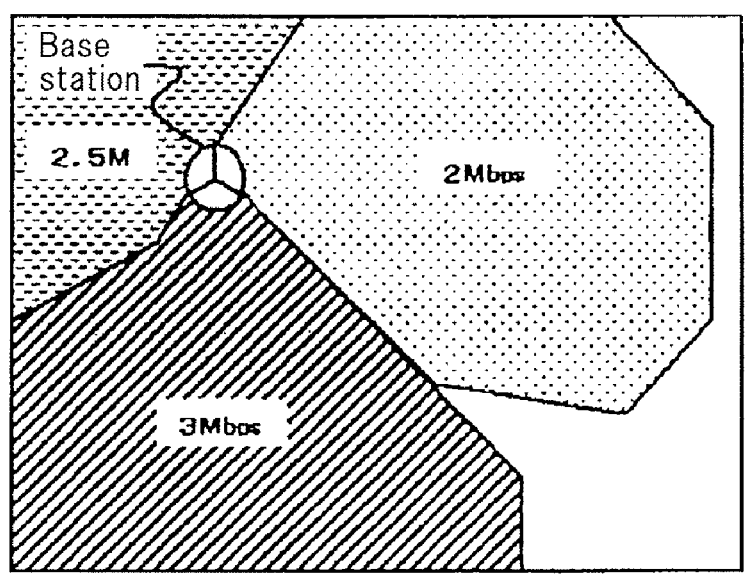
FIG. 13 is a schematic view showing an example of the representation of the geographical distribution of the estimated HSUPA maximum cell throughput.

To facilitate visual comprehension, the geographical distribution of the estimated HSUPA maximum cell throughput may be represented as a plan shown in FIG. 13, and further, may be represented by color differences according to the values of the HSUPA maximum cell throughput. FIG. 13 is provided with a single base station that manages three cells and shows an example of the geographical distribution of the HSUPA maximum cell throughput of each cell.

(Fourth Exemplary Embodiment)

The throughput estimation system of the fourth exemplary embodiment differs from the first to third exemplary embodiments in that a process is provided in the HSUPA simulation means for calculating the interference power that is applied by HSUPA channels that occur in other cells to the HSUPA channel of its own cell (hereinbelow referred to as "other-cell HSUPA interference calculation process"). The configuration and operations are otherwise identical to the throughput estimation system shown in the first exemplary embodiment and explanation of these points is therefore here omitted.

Figure 14:
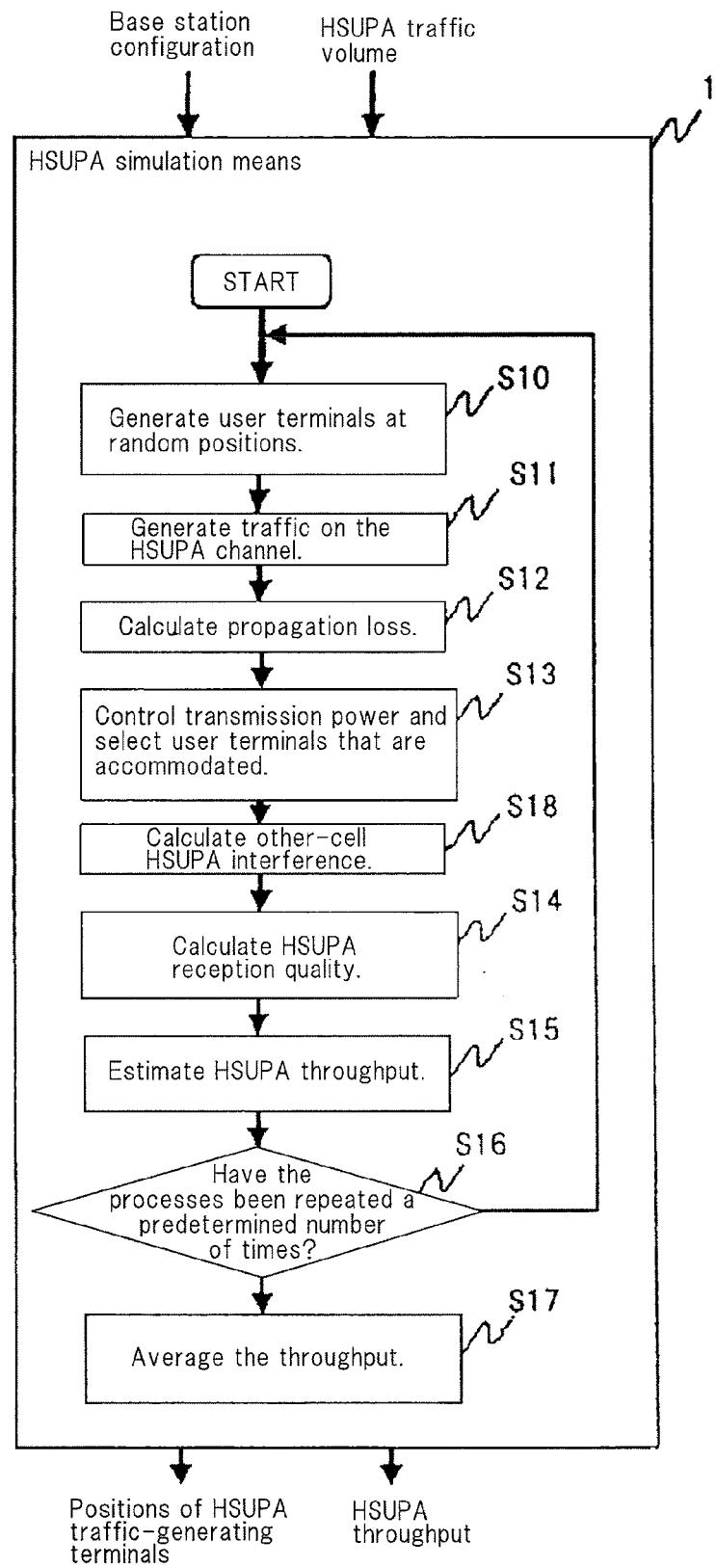
FIG. 14 is a flow chart showing the procedure of the HSUPA simulation means provided in the throughput estimation system of the fourth exemplary embodiment.

FIG. 14 is a flow chart showing the procedure of the HSUPA simulation means that is provided in the throughput estimation system of the fourth exemplary embodiment.

As shown in FIG. 14, the present exemplary embodiment differs from the first to third exemplary embodiments in that an other-cell HSUPA interference calculation process (Step S18) is executed in HSUPA simulation means 1 of the present exemplary embodiment between the processes of Step S13 and Step S14 of the processes executed in HSUPA simulation means 1 shown in FIG. 4. The configuration and operations are otherwise identical to the throughput estimation system shown in the first to third exemplary embodiments and explanation of these points is therefore here omitted.

Typically, interference power from user terminals that are present in other cells must be considered in a multicell environment. Because traffic of HSUPA channels is generated instantaneously, great variation occurs for each snapshot when the HSUPA interference power value from other cells (other-cell HSUPA interference power value) is modeled by snapshots. The problem therefore arises that the number of repetitions of simulation using snapshots must be increased to raise the estimation accuracy, resulting in lengthy processing time.

In the present exemplary embodiment, the other-cell HSUPA interference power is found by calculating a stochastic average value. By executing this type of process, other-cell HSUPA interference power that is generated instantaneously can be found stably by a single process.

In the present exemplary embodiment, the average value of interference power caused by the generation of traffic on HSUPA channels of other cells is found by the method shown below, and this value is used as the other-cell HSUPA interference power value to estimate the other-cell HSUPA interference power value in a short processing time and with high accuracy. As a result, the reception quality of HSUPA channels can be estimated in a short processing time and with high accuracy, and the user throughput can be estimated in a short processing time and with high accuracy.

Figure 15:
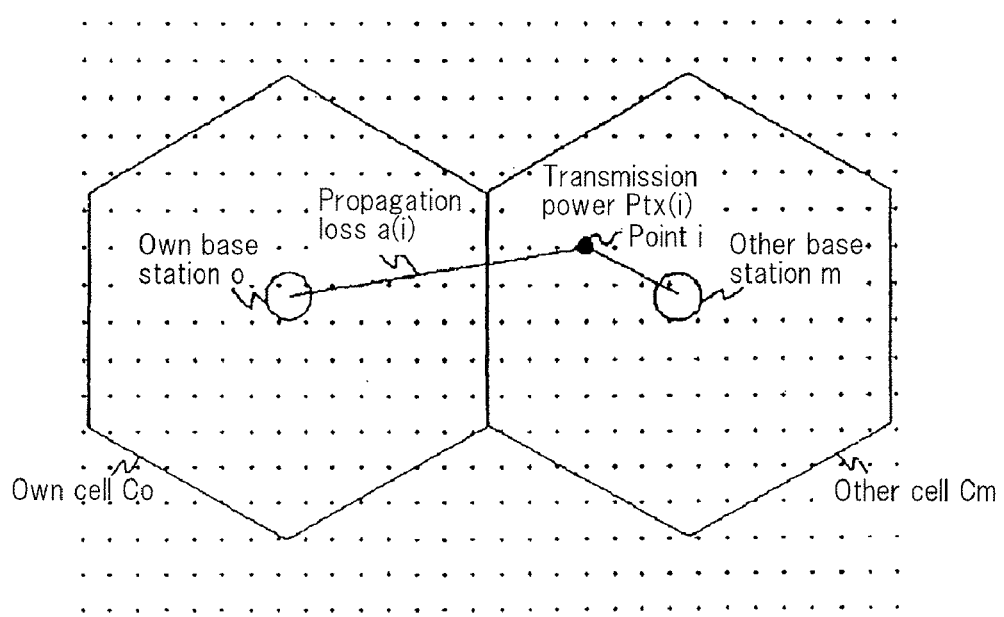
FIG. 15 is a schematic view showing the other-cell HSUPA interference calculation process shown in FIG. 14.

An actual procedure for finding the other-cell HSUPA interference power value is next described using FIG. 15.

When HSUPA simulation means 1 seeks the other-cell HSUPA interference power value that influences cell Co that is managed by its own base station o, it first assumes the uniform existence at probability Pex(m) of an HSUPA traffic-generating terminal at point i in another cell Cm and calculates the average value $P_{inf}$ of the HSUPA interference power.

HSUPA simulation means 1 executes the processes of (1)-(4) below to find average value $P_{inf}$ of the HSUPA interference power:

(1) Assume the existence of an HSUPA traffic-generating terminal at point i in other cell Cm.
(2) Implement control of DPCCH transmission power in HSUPA traffic-generating terminal of point i and calculate E-DPDCH transmission power Ptx(i).
(3) Find propagation loss a(i) between its own base station o and point i.
(4) Find average value $P_{inf}$ of the other-cell HSUPA interference power by the following Formula (4):

$$P_{inf} = \sum_{m=1}^{M} \sum_{i \in Cm}^{N_m} \{P_{tx}(i) \times a(i) \times P_{ex}(m)\} \quad (4)$$

where $Pex = g(L_m)/N_m$

In addition, m is an index given to another cell, M is the total number of other cells, i is an index given to a point, $N_m$ is the total number of points in other cell m, $L_m$ is the HSUPA traffic volume in other cell Cm, and $g(L_m)$ is a function that is proportional to the traffic volume of the HSUPA channel.

According to the present exemplary embodiment, other-cell HSUPA interference power value that is instantaneously generated can be found stably by a single process. The other-cell HSUPA interference power value can therefore be estimated in a short processing time. In addition, combining the calculated other-cell HSUPA interference power with the processing results shown in the first to third exemplary embodiments enables simulation that is closer to reality, enables more accurate estimation of the reception quality of HSUPA channels, and enables highly accurate estimation of the user throughput of HSUPA channels in a short processing time.

This application is based upon and claims the benefit of priority from Japanese patent application No. 2007-137853, filed on May 24, 2007, the disclosure of which is incorporated herein in its entirety by reference.

The invention claimed is:

1. A throughput estimation method for estimating throughput of a first channel in a cellular system that provides an uplink wireless communication service, that is equipped with a base station for managing at least one cell, and in which said first channel and a second channel that are used in said uplink wireless communication service coexist in said cell; said throughput estimation method comprising steps of:
    calculating noise rise of said second channel from the traffic volume of said second channel;
    using a target RTWP that is the target total reception power of the base station and that is set in said base station and said noise rise to calculate a ratio of resources available for allocating to said first channel, wherein said resources are used in said wireless communication service; and
    using said resource ratio to calculate throughput of said first channel.

2. A throughput estimation system for estimating throughput of a first channel in a cellular system that provides an uplink wireless communication service, that is equipped with a base station for managing at least one cell, and in which said first channel and a second channel that are used in said uplink wireless communication service coexist in said cell; said throughput estimation system comprising:
    first simulation means for estimating throughput of said first channel from the traffic volume of said first channel;
    second simulation means for calculating noise rise of said second channel from the traffic volume of said second channel;
    resource ratio calculation means for: calculating a target cell load from a target RTWP that is the target total reception power of the base station that is set in said base station, calculating said second channel cell load from the noise rise of said second channel, and finding a ratio R of resources available for allocating to said first channel, wherein said resources are used in said wireless communication service from R=1−(second channel cell load/target cell load); and
    throughput correction means for using said resource ratio R to correct throughput of said first channel that was estimated by said first simulation means.

3. The throughput estimation system according to claim 2, wherein said throughput correction means corrects throughput of said first channel by multiplying the throughput of said first channel that was estimated by said first simulation means by a function f(R) that takes said resource ratio R as an argument.

4. The throughput estimation system according to claim 2, wherein said first channel is an HSUPA channel, and said second channel is a dedicated channel that is individually allocated to each user terminal.

5. The throughput estimation system according to claim 4, wherein said user terminal both allocates resources that are used by said wireless communication service to said dedicated channel to transmit data and allocates remaining resources to said HSUPA channel to transmit data.

6. The throughput estimation system according to claim 2, wherein said first simulation means and second simulation means estimates said throughput by executing Monte Carlo simulation.

7. The throughput estimation system according to claim 2, wherein said first simulation means uses, as an interference power value from another cell, a stochastic average value of an interference power value that is calculated by assuming that user terminals that use said first channel are uniformly probability-distributed in the other cell in proportion to the traffic volume of said first channel.

8. The throughput estimation system according to claim 3, wherein said function f(R) is f(R)=R.

9. The throughput estimation system according to claim 3, wherein said function f(R) is a logarithmic function.

10. The throughput estimation system according to claim 2, wherein said throughput is user throughput that indicates throughput of user data that is measured at a user terminal.

11. The throughput estimation system according to claim 2, wherein said throughput is maximum cell throughput that indicates total throughput of each cell that is measured at said base station.

12. The throughput estimation system according to claim 11, wherein said first simulation means:
   calculates maximum cell throughput when traffic of the first channel is generated at lattice points in a cell; and
   supplies the average value of the maximum cell throughput of a plurality of cases that assume the generation of traffic of the first channel at all lattice points in a cell without duplication.

\* \* \* \* \*